Dec. 30, 1969     T. F. GRIFFETH ET AL     3,487,302
MOISTURE CONTENT TESTER INCLUDING A PROBE
HAVING A MATERIAL SAMPLING CHAMBER
Filed March 14, 1966
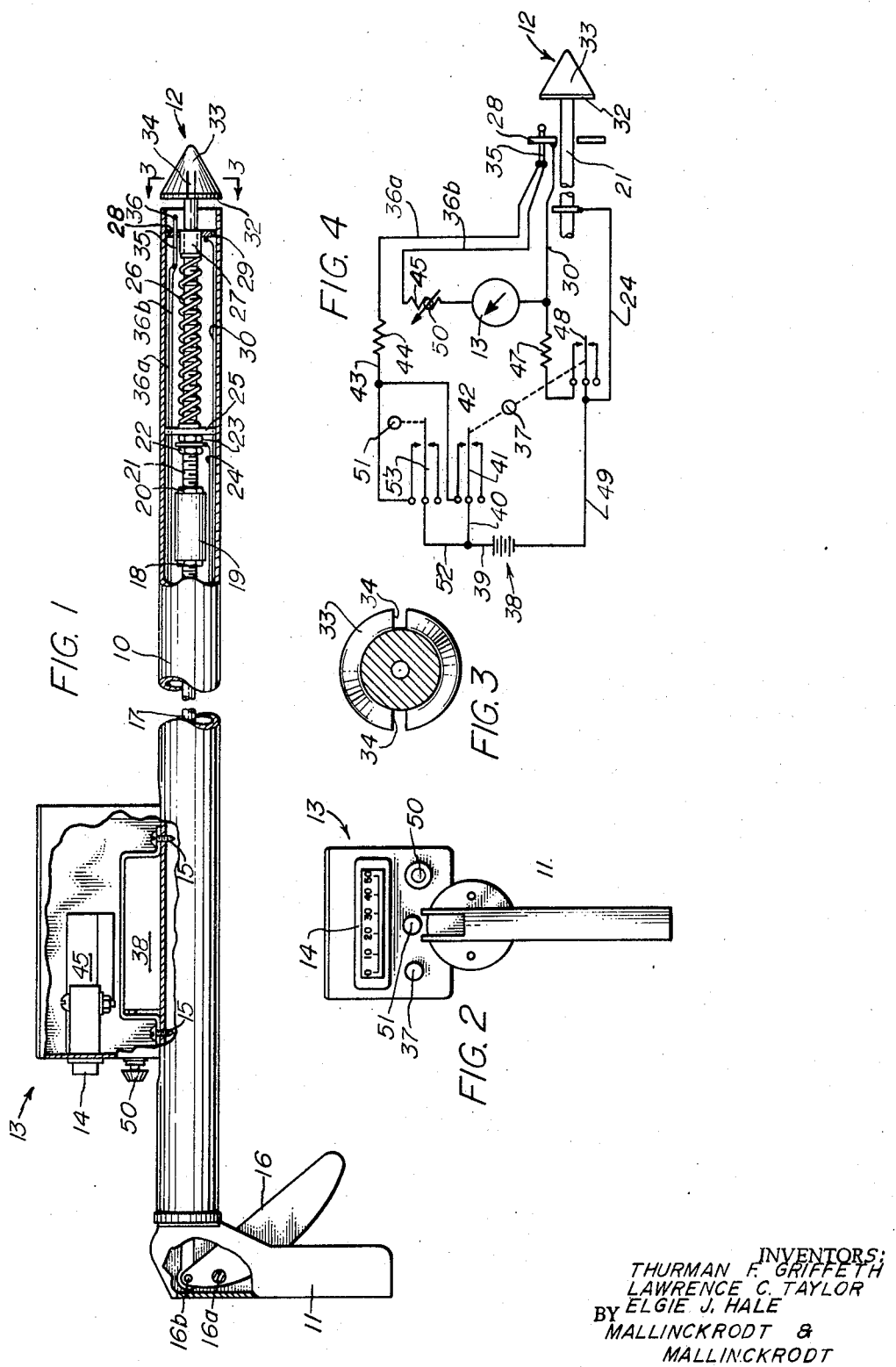
INVENTORS:
THURMAN F. GRIFFETH
LAWRENCE C. TAYLOR
ELGIE J. HALE
BY MALLINCKRODT &
   MALLINCKRODT
ATTORNEYS.

United States Patent Office

3,487,302
Patented Dec. 30, 1969

3,487,302
MOISTURE CONTENT TESTER INCLUDING A PROBE HAVING A MATERIAL SAMPLING CHAMBER
Thurman F. Griffeth, P.O. Box 248, Preston, Idaho 83263; Lawrence C. Taylor, 1024 Beecher Ave., Brigham City, Utah 84302; and Elgie J. Hale, 1040 Arlington Way, Bountiful, Utah 84010
Filed Mar. 14, 1966, Ser. No. 534,128
Int. Cl. G01r 27/02
U.S. Cl. 324—65    4 Claims

ABSTRACT OF THE DISCLOSURE

An electrical conductivity measurement device for testing various materials, such as grain, for moisture content. The device provides a material-measuring chamber of predetermined volumetric capacity that can be opened for receiving material to be tested, and limit stop means for maintaining such predetermined volumetric capacity when the chamber is closed.

---

In the handling of grains it is frequently important that the moisture content of the grain be within acceptable limits. This may be important, for example, in determining whether a load of grain, truck, railroad car, etc. can be suitably stored. If the grain contains too high a moisture content, the grain will spoil, but if the moisture content is known, the grain can be dried before any significant spoilage occurs. For the same reason, it is important that continuous checks be made of grains in storage.

Various means have been employed in the past to make such moisture determinations, but, so far as we are aware, there has not heretofore been developed a lightweight, portable and accurate unit that can repeatedly receive and test samples of uniform volume and compaction.

It is an object of the present invention to provide a sampling and test instrument that is lightweight and portable and that will allow extremely accurate direct readings of the moisture content of successive samples of uniform volume and compaction.

To accomplish this object we provide a rugged instrument including an elongate probe tube that can be supplied with a predetermined volume of grain kernels to be tested or that can be inserted to any desired depth into a mass of grain, a probe tip being supplied on the end of the tube to facilitate its insertion in the grain to be sampled and tested. Means are provided for holding a predetermined quantity of the grain between electrodes that are connected in an electrical circuit, including a temperature compensating means to insure accurate readings and a direct reading meter calibrated to read the percent moisture content of the grain stabilized.

While the instrument here disclosed is particularly adapted for use in determining the moisture content of grains it should be apparaent that it has many other uses, and that it can be used to determine the moisture content of other materials, as well. It should also be apparent that the particular direct reading scale and the electrical circuit used with the instrument can be varied, as required, to provide the desired reading range for any particular material to be tested, and that by using conventional switch arrangements it is possible to provide several such circuits in a single instrument, and that several scales can be provided on the same dial if desirable to increase the versatility of the instrument.

There is shown in the accompanying drawings specific embodiments of the invention representing what are presently regarded as the best modes of carrying out the generic concepts in actual practice. From the detailed description of these presently preferred forms of the invention, other more specific objects and features will become apparent.

In the drawing:
FIG. 1 is a side elevation view of a preferred form of moisture content tester, broken away for convenience of illustration;
FIG. 2, an end elevation;
FIG. 3, an enlarged vertical section taken on the line 3—3 of FIG. 1;
FIG. 4, a somewhat schematic diagram of the electrical circuit used with the moisture content tester.

Referring now to the drawings:
In the embodiment illustrated in FIGS. 1–3, the moisture content tester includes a probe body in the form of an elongate, tubular housing 10, having a handle 11 at one end and a material-penetrating end member in the form of a pointed tip, shown generally at 12, at the other end. An annular skirt portion 10a of such probe body projects toward probe end member 12 to define a material-sampling chamber C, the forward end of such skirt adjacent to the material-penetrating end member 12 providing a limit stop 10b against which the back of probe end member or tip 12 abuts when the chamber is closed.

A meter 13, including a direct reading dial 14, is fixed to housing 10, as by screws 15.

An actuator lever 16 pivoted at 16a is carried by handle 11 and has one end protruding therefrom. The other end of lever 16 is pivotally connected at 16b to one end of a rod 17 that extends into housing 10 and that is threaded into a nut 18 fixed on an insulator coupling 19. A nut 20 on the other end of the insulator coupling is threaded onto a similar rod 21 that extends to tip 12.

A pair of nuts 22 and 23 are threaded onto rod 21, adjacent to the insulator coupling and secure the end of lead wire 24 therebetween. A guide plate 25 surrounds rod 21 and is held against nut 23 by a spring 26 that surrounds the rod 21 and acts between a bushing 27 and the guide plate to force nuts 23 and 24, rod 21 and rod 17 coupled thereto towards the handle 11.

Bushing 27 is made of nylon or other non-conducting material and is securely fitted within a plate 28 of conductive material. Plate 28 is then tightly fitted within a ring 29 of non-conductive material to insulate it from the housing 10.

Another lead wire 30 is electrically connected to plate 28, passes through the guide plate and, as will be explained, is connected into the battery powered operating circuit.

Rod 21 passes freely through bushing 27 and is electrically connected to a plate 32 on an enlarged end of tip 12. The plate 32 is fixed to a tapered member 33, made of nylon or other non-conducting material, that forms a point for the tip.

Point member 33 may be provided with one or more slots 34, if desired, to provide entrance paths for grain as the instrument is inserted.

An insulated rod 35 extends through plate 28 and has a thermistor 36 mounted in the end thereof adjacent tip 12. The lead wires 36a and 36b for the thermistor pass through rod 35 and guide plate 25 and are connected into the operating circuit, as will be more fully explained.

As spring 26 biases rod 21 toward the handle it biases the tip 12 toward limit stop 10b. If lever 16 is squeezed toward handle 11 rods 17 and 21 are operated to move tip 12 away from such limit stop.

In operation, handle 11 is grasped to hold the instrument and to push tip 12 and housing 10 into a volume of grain at a desired location and to a desired depth. Lever 16 is then squeezed towards handle 11 to move the probe end member or tip 12 away from limit stop 10a so as to open sampling chamber C. At this time kernels of grain fall into the open sampling chamber, and are stabilized as to both volume and compaction when lever 16 is released and spring 26 biases the probe end member or tip 12 against limit stop 10b.

Meter 13 is then actuated to complete an electrical circuit including electrode plates 28 and 32 and through the grain therebetween and a reading is obtained from dial 14.

Meter 13 is calibrated by the user's pushing button 37 to complete a circuit from battery 38 through lines 39 and 40, switch blade 41, lines 42 and 43, resistor 44, line 36a, thermistor 36, line 36b, variable resistor 45, meter 13, resistor 47, switch blade 48 and line 49. Button 37 is held until knob 50 is turned to change the top of variable resistor 45 until the indicator of dial 14 reads at the upper dial reading.

After the meter has been calibrated, the instrument can be inserted into the grain, the kernels can be stabilized in the manner previously disclosed and button 51 can be actuated to give a reading of the moisture content of the stabilized kernels. The circuit completed when button 51 is pushed is from battery 38, through lines 39 and 52, switch blade 53, line 43, resistor 44, line 36a, thermistor 36, line 36b, variable resistor 45, meter 13, line 30, plate 28, kernels of grain, stabilized between plates 28 and 32, plate 32, rod 21, line 24, and line 49.

The simple and compact construction of the moisture content indicator makes it light in weight and extremely versatile. The readings obtained are accurate since the grain tested is stabilized long enough to obtain a reading and the thermistor resistance changes to compensate for the effects of temperature on the reading that would otherwise be obtained.

Other stabilizing means could be employed, and the instruments could be made to have the contact plates separated during insertion into the grain and closed upon actuation of the lever attached to the handle, but preferred forms of the invention are here disclosed.

Whereas this invention is here described and illustrated with respect to certain forms thereof, it is to be understood that many variations are possible.

We claim:

1. In a moisture-content testing device, the combination of an elongate probe having a body and a material-penetrating end member aligned along an axis in common, said end member being movable axially of the probe toward and away from said body; a skirt extension of the said body extending toward said end member and defining a material-sampling chamber of predetermined volumetric capacity between said end member and said body, the free end of said skirt providing a limit stop member to maintain said predetermined volumetric capacity for said chamber at all times when closed; an electrode serving as one end of said chamber; a second electrode serving as an opposite end of said chamber; movable means operative on said probe end member to move it toward and away from said body for opening and closing said chamber to material to be tested into which the probe is pushed; and an electrical measurement circuit in which said electrodes are connected for measuring the electrical conductivity of a sample of material filling said chamber.

2. A combination according to claim 1, wherein the skirt extends from securement to the probe body, and the back of the probe end member is adapted to seat against the free end of said skirt as a limit stop in closing the material-sampling chamber, one of the electrodes being carried by said back of the probe end member.

3. A combination according to claim 2, wherein a spring is provided to normally maintain the probe end member in its chamber-closing position against the free end of the skirt; and the movable means include a handle, trigger, and linkage mechanism for forcing said probe end member away from said free end of the skirt to open the chamber for the reception of material to be tested.

4. A combination according to claim 3, wherein the linkage mechanism includes a push rod extending internally and longitudinally of the probe body, the spring being coiled about said rod.

References Cited

UNITED STATES PATENTS

| | | | |
|---|---|---|---|
| 1,610,563 | 12/1926 | McIlvaine | 324—65 |
| 2,444,207 | 6/1948 | Smith | 324—65 XR |
| 2,553,754 | 5/1951 | Dietert et al. | 324—65 |
| 2,764,892 | 10/1956 | Rosenthal | 324—62 XR |
| 3,005,152 | 10/1961 | Jennings et al. | 324—65 |
| 3,264,558 | 8/1966 | Heeps | 324—65 |

FOREIGN PATENTS

| | | |
|---|---|---|
| 178,475 | 10/1953 | Austria. |
| 759,042 | 10/1956 | Great Britain. |

EDWARD E. KUBASIEWICZ, Primary Examiner